United States Patent
Lee et al.

(10) Patent No.: US 8,170,556 B2
(45) Date of Patent: May 1, 2012

(54) METHOD FOR INITIATING UPLINK SIGNALING PROACTIVELY BY MBMS UE

(75) Inventors: Kook-Heui Lee, Yongin-si (KR); Sung-Ho Choi, Suwon-si (KR); Detao Li, Beijing (CN); Hong Wang, Beijing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 308 days.

(21) Appl. No.: 10/561,232

(22) PCT Filed: Jul. 8, 2004

(86) PCT No.: PCT/KR2004/001678
§ 371 (c)(1),
(2), (4) Date: Apr. 23, 2007

(87) PCT Pub. No.: WO2005/006596
PCT Pub. Date: Jan. 20, 2005

(65) Prior Publication Data
US 2007/0206530 A1      Sep. 6, 2007

(30) Foreign Application Priority Data
Jul. 9, 2003 (CN) .................................. 03 1 47532

(51) Int. Cl.
*H04W 36/00* (2009.01)
*H04W 4/00* (2009.01)
*H04W 1/00* (2006.01)

(52) U.S. Cl. .................. 455/436; 455/435.1; 455/552.1; 370/329

(58) Field of Classification Search .................... 455/436
See application file for complete search history.

(56) References Cited

U.S. PATENT DOCUMENTS 6,047,071 A * 4/2000 Shah .............................. 380/273
(Continued)

FOREIGN PATENT DOCUMENTS
JP         2006516070         6/2006
(Continued)

OTHER PUBLICATIONS

Anonymous, 3GPP TS 25.346 V2.0.0, 3rd Generation Partnership Project, Technical Specification Group Radio Access Network, Introduction of the Multimedia Broadcast Multicast Service (MBMS) in the Radio Access Network (Stage-2), (Release 6), Jun. 2003.

(Continued)

*Primary Examiner* — Lester Kincaid
*Assistant Examiner* — Andy Gu
(74) *Attorney, Agent, or Firm* — Roylance, Abrams, Berdo & Goodman, L.L.P.

(57) ABSTRACT

A method for initiating uplink signaling proactively by the MBMS UE, comprising steps of: the UE moving to a new cell; listening to information on a MCCH; initiating an uplink signaling according to information on the MCCH; sending a response message to the UE by a RNC, or if no UE moving to the new cell, initiating the uplink signaling proactively by the UE if the information received from the MCCH includes an indication for UE counting; and sending a response message to the UE by the RNC. The UE in URA_PCH mode and IDLE mode can response to the MBMS Notification message sent by the RNC, and can initiate the Cell Update process or the RRC Connection process in order to obtain the MBMS parameters. The RNC sets different contents for the response message according to different reasons of message initiation.

16 Claims, 10 Drawing Sheets

U.S. PATENT DOCUMENTS

| | | | |
|---|---|---|---|
| 6,782,274 B1 * | 8/2004 | Park et al. | 455/552.1 |
| 6,850,759 B2 * | 2/2005 | Van Lieshout et al. | 455/426.1 |
| 7,031,694 B2 * | 4/2006 | Koulakiotis et al. | 455/406 |
| 7,433,334 B2 * | 10/2008 | Marjelund et al. | 370/329 |
| 2002/0110106 A1 * | 8/2002 | Koo et al. | 370/341 |
| 2003/0003895 A1 * | 1/2003 | Wallentin et al. | 455/410 |
| 2003/0236085 A1 * | 12/2003 | Ho | 455/411 |
| 2004/0037304 A1 * | 2/2004 | Khawand et al. | 370/432 |
| 2004/0102212 A1 * | 5/2004 | Sarkkinen et al. | 455/552.1 |
| 2004/0157640 A1 * | 8/2004 | Pirskanen et al. | 455/552.1 |
| 2004/0266447 A1 * | 12/2004 | Terry | 455/450 |

FOREIGN PATENT DOCUMENTS

| | | |
|---|---|---|
| JP | 2006526316 | 11/2006 |
| WO | WO 01/80590 | 10/2001 |
| WO | WO 03/017523 | 2/2003 |

OTHER PUBLICATIONS

Anonymous, 3GPP TR 23.846 v6.1.0, 3rd Generation Partnership Project, Technical Specification Group Services and System Aspects, Multimedia Broadcast/ Multicast Service, Architecture and Functional Description, (Release 6), Dec. 2002.

Anonymous, "3$^{rd}$ Generation Partnership Project; Technical Specification Group Radio Access Network; Introduction of the Multimedia Broadcast Multicast Service (MBMS) in the Radio Access Network (Stage-2); (Release6)", 3GPP TS 25.346 V1.6.0 (2003-2005), May 2003.

LG Electronics Inc, "MBMS Access Based on Required UE Radio Access Capability", XP 050141564, TSG-RAN Working Group 2 MBMS Adhoc, R2-030909, Paris, France, May 2003.

Nokia Corp., "UE Procedures", XP 050141547, TSG-RAN Working Group 2 on MBMS, Tdoc R2-030887, Paris, France, May 2003.

Siemens Corp., "Considerations on counting and tracking", XP 050122626, TSG-RAN Working Group 2 Meeting #33, R2-023165, Sophia Antipolis, France, Nov. 2002.

* cited by examiner

METHOD FOR INITIATING UPLINK SIGNALING PROACTIVELY BY MBMS UE

BACKGROUND OF THE INVENTION

1. Field of the Invention

This invention relates to a system of multimedia multicast/broadcast service (hereinafter referred to as MBMS), especially relates to a method for initiating uplink signaling proactively by a MBMS UE.

2. Description of the Related Art

MBMS is a new service proposed by 3rd Generation Partnership Project (referred to as 3GPP) and under standardization. The MBMS is a service that transfers the same multimedia data to multiple UE Equipments (hereinafter referred to as UE). In order to provide the MBMS, the system transfers the data that are originally transferred to a UE individually to multiple UEs simultaneously, which aims to make use of resources efficiently.

Firstly, the network executes the announcement of MBMS contents needed by the transmission to the UEs. After receiving this information, the UEs that determine to use this service can transfer their information to the network via a joining process. Before data transmission is started, the network sends an indication information to the UE and counts the number of UEs, which is used to decide to use point-to-point or point-to-multipoint channel type, and then the data transmission is started.

According to the connection state of radio resource control (hereinafter referred to as RRC) between the UE and a radio network controller (hereinafter referred to as RNC), states of the UE can be classified into five states, i.e. IDLE, CELL_DCH; CELL_FACH, CELL_PCH and URA_PCH and the latter four states are also called connection mode. The UE can receive MBMS data in the IDLE mode or in connection mode.

When the UE in URA_PCH mode moves to a new cell and if the cell is a new URA, the UE needs to sends an uplink message of "URA Update". When the UE in URA_PCH mode has uplink data to transfer, or receives a paging message from the RNC, the UE needs to send an uplink message of "Cell Update".

When the UE in IDLE mode receives a paging message or wants to initiate a service, it sends an uplink message of "RRC Connection".

In current "RRC connection" message, 12 bits are used to indicate the reason for RRC connection establishment in which there are 20 reasons together. In current "Cell Update" message, there are 6 reasons for the initiation of the Cell Update message.

However, several reasons for the RRC connection establishment and cell update cannot meet with the requirement of the MBMS presently.

When the UE is in URA_PCH or When IDLE mode is receiving MBMS data or when Controlling RNC (CRNC) needs to collect the counting of the number of UEs, the UE in URA_PCH or IDLE mode should send an uplink message to let the RNC count the number. When the Controlling RNC needs to establish a point-to-point MBMS channel, the UE in URA_PCH or IDLE mode should send an uplink message to establish point-to-point (hereinafter referred to as PtP) channel and enter CELL_DCH state. When the UE moves to a new cell, if the UE can obtain MBMS channel configuration parameters of the new cell in advance and the MBMS channel type of the new cell is point-to-multipoint, the UE can keep staying in its original state and continue to receive the MBMS data only if re-configuring its MBMS receiving channel according to the MBMS channel configuration parameters of the new cell. However, if the channel type of the new cell is point-to-point, or the UE didn't obtain the MBMS channel configuration parameters of the new cell before the UE moves, how can the UE in URA_PCH mode obtain the MBMS channel configuration parameters of the new cell? This is an open issue in current system.

SUMMARY OF THE INVENTION

The object of this invention is to provide a method for MBMS UE to initiate uplink signaling proactively. To realize above object, a method for initiating uplink signaling proactively by a MBMS UE comprising steps of:

the MBMS UE moving to a new cell;

listening to information on a MBMS control channel;

initiating an uplink signaling according to the information on the MBMS control channel;

sending a response message to the UE by the RNC, or if no UE moving to a new cell, initiating an uplink signaling proactively by the UE if the information received from the MBMS control channel includes an indication for UE counting; and sending a response message to the UE by the RNC.

According to this invention, the UE in URA_PCH mode and IDLE mode can response to the MBMS Notification message sent by the RNC, and can initiate a Cell Update process or a RRC Connection process in order to obtain the MBMS parameters. According to this invention, the RNC can define different contents of the response message according to different reasons of the message initiation. The UE in CELL_FACH or CELL_PCH mode needs to read the channel type parameter of the MBMS on MBMS control channel (MCCH) etc. And then the UE initiates the Cell Update process according to the channel type. When the UE in CELL_PCH mode receives an indication on MCCH, it can also initiate the Cell Update process. Different reasons for the cell update which are set according to different cases can make the RNC process accordingly.

DETAILED DESCRIPTION OF THE PREFERRED EMBODIMENTS

Figure 1:
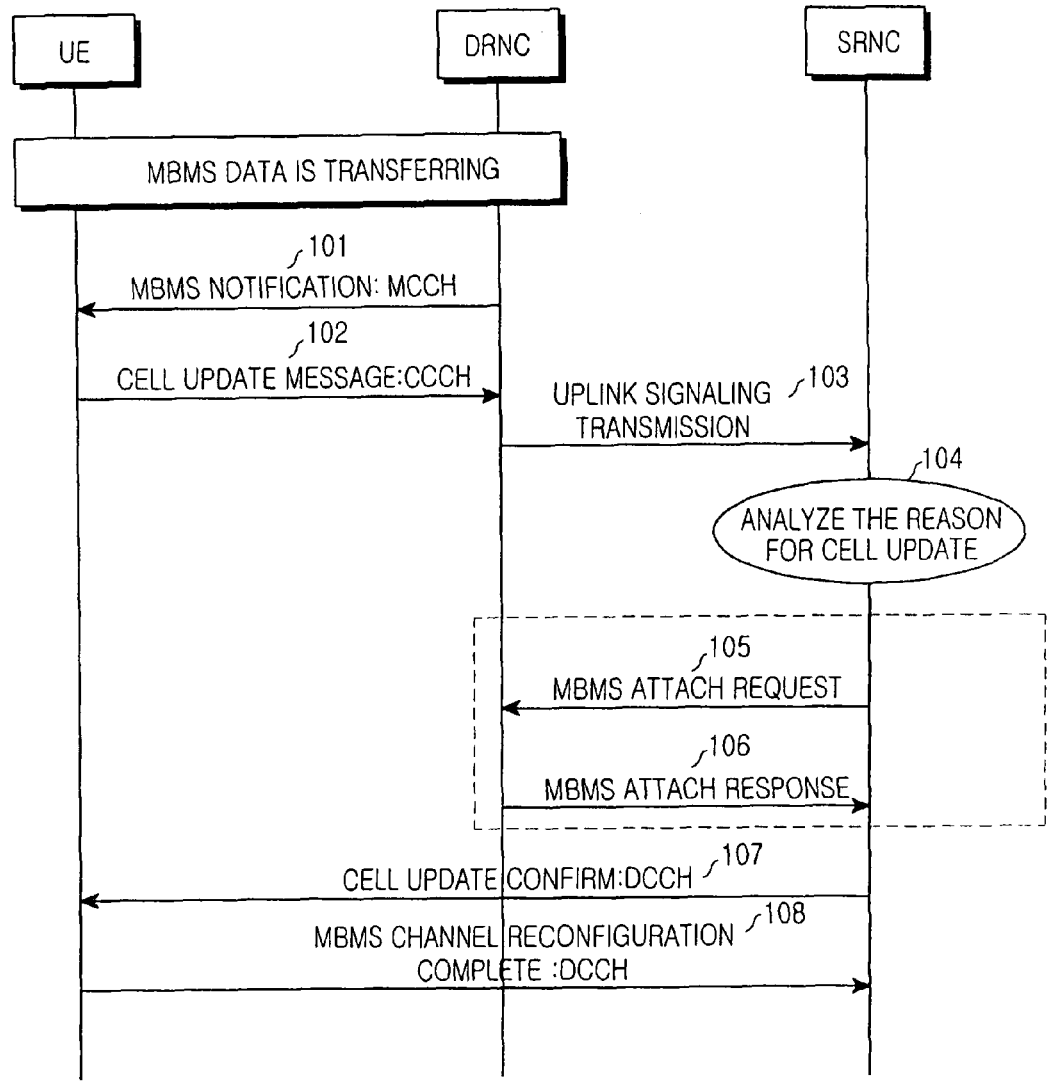
FIG. 1 shows that UE in URA_PCH mode responses to the notification message from the RNC.

This invention proposes following solution:

the UE in URA_PCH mode sends the uplink message of "Cell Update" according to the requirement of the current cell it stays.

When the UE in URA_PCH mode moves to the new cell, it sends the uplink message of "Cell Update" according to the requirement of the new cell as well as its own needs.

In this method, two reasons for initiating the Cell Update message are added. One reason for cell update is "For MBMS UE counting", and the other reason added is divided into two cases, the first case is that the UE in URA_PCH mode can obtain the MBMS channel configuration parameters of the destination cell before cell handoff, only when the destination cell uses the PtP channel, it will initiates the Cell Update process, and the reason for cell update is "For MBMS PTP mode". The second case is that UE in URA_PCH mode cannot obtain MBMS channel configuration parameters of the destination cell before it moves, it needs to initiate the Cell Update process when it moves to a new cell, and the reason for cell update is "For MBMS channel parameters".

The UE in IDLE mode sends the uplink message "RRC Connection Request" according to the requirement of current cell it stays.

When the UE in IDLE mode moves to the new cell, it sends the uplink message "RRC Connection Request" according to the requirement of the new cell as well as its own needs.

In this method, two reasons for initiating RRC Connection message are added. One reason for RRC connection establishment is "For MBMS UE counting", and the other reason added is divided into two cases. The first case is that the U.E in IDLE mode can obtain the MBMS channel configuration parameters of the destination cell before cell handoff, only when the destination cell uses the PtP channel, it will initiates a RRC Connection process, and the reason for connection establishment is "For MBMS PTP mode". The second case is that if the UE in IDLE mode cannot obtain the MBMS channel configuration parameters of the destination cell, it needs to initiate a RRC Connection Request process when it moves to, the new cell, and the reason for connection establishment is "For MBMS channel parameters".

When the UE in CELL_FACH mode moves to the new cell, it sends the uplink message of "Cell Update" according to the requirement of the new cell as well as its own needs. In this method, two reasons for initiating Cell Update message are added. One reason for cell update is "For MBMS UE counting", and the other reason added is divided into two cases. The first case is that if the UE in URA_PCH mode can obtain the MBMS channel mode and configuration parameters of the destination cell before the cell handoff, only when the destination cell uses the PtP channel, it will initiates the Cell Update process, and the reason for cell update is "For MBMS PTP mode". The second case is that if the UE in URA_PCH mode cannot obtain MBMS channel configuration parameters of the destination cell before moving, it needs to initiate the Cell Update process when it moves to the new cell, and the reason for cell update is "For MBMS channel parameters".

The UE in CELL_PCH mode sends the uplink message "Cell Update" according to the requirement of current cell it stays.

When UE in CELL_PCH mode moves to a new cell, it sends the uplink message "Cell Update" according to the requirement of the new cell as well as its own needs. In this method, two reasons for initiating Cell Update message are added. One reason for cell update is "For MBMS UE counting", and the other reason added is divided into two cases. The first case is that if the UE in URA_PCH mode can obtain the MBMS channel mode and configuration parameters of the destination cell, only when the destination cell uses the PtP channel, it initiates the Cell Update process, and the reason for cell update is "For MBMS PTP mode". The second case is that if the UE in URA_PCH mode cannot obtain the MBMS channel configuration parameters of the destination cell, it needs to initiate the Cell Update process when it moves to the new cell, and the reason for cell update is "For MBMS channel parameters".

In the following, the example for this invention will be explained in detail in combination with the figures attached.

This invention proposes the process for UEs in different modes to initiate uplink signaling proactively. For URA_PCH, CELL_PCH or CELL_FACH mode, the uplink signaling is Cell Update; For IDLE mode, the uplink signaling is RRC Connection Request. This invention proposes to add reasons for initiating Cell Update and RRC Connection Request, and the RNC will process differently according to the different initiation reasons.

This invention proposes the processes for initiating Cell Update in three cases for the UE in URA_PCH. The first case is that when the message (may be a paging message or other message) sent from the RNC to the UE includes the indication for counting of UEs, after the UE that stays in URA_PCH mode and has joined the MBMS service group receives this message, it needs to sends the Cell Update message to the RNC to make the RNC count the UEs in URA_PCH mode. The second case is that when the message (may be a paging message or other message) sent from the RNC to the UE includes the indication that MBMS channel is in PtP mode, after the UE that stays in URA_PCH mode and has joined the MBMS service group receives this message, it needs to sends the Cell Update message to the RNC to establish a PtP MBMS channel with RNC. The third case is that when the UE in URA_PCH mode moves to the new cell and it didn't know the MBMS channel configuration parameters of the new cell, the UE needs to initiate the Cell Update message to obtain the MBMS channel configuration parameters of the new cell.

This invention also proposes the processes of initiating RRC Connection Request in three cases for the UE in IDLE mode. The first case is that when the message (may be a paging message or other message) sent from the RNC to the UE includes the indication for counting UEs, after the UE that stays in IDLE mode and has joined the MBMS service group receives this message, it needs to send the RRC Connection Request message to the RNC to make the RNC count UEs in IDLE mode. The second case is that when the message (may be a paging message or other message) sent from the RNC to the UE includes the indication that the MBMS channel is in PtP mode, after the UE that stays in IDLE mode and has joined the MBMS service group receives this message, it needs to sends the RRC Connection Request message to the RNC to establish the PtP MBMS channel with the RNC. The third case is that when the UE moves to a new cell, it didn't know the MBMS channel configuration parameters of the new cell, and the UE needs to initiate the RRC Connection Request message to obtain the MBMS channel configuration parameters of the new cell.

This invention also proposes a process of uplink signaling initiation for the UE that stays in CELL_FACH or CELL_PCH mode and has applied for MBMB. Before the UE in CELL_FACH or CELL_PCH mode performs the Cell Update process, it first reads the channel type parameter of MBMS on the MBMS control channel(MCCH). And then the UE initiates the Cell Update process according to the channel type, here the Cell Update message can include different information elements to distinguish different channel types. If the DRNC doesn't save the UEs in CELL_PCH mode into the MBMS Context, the UE in CELL_PCH mode also needs to initiate the Cell Update process when receiving an indication for UE counting on the MCCH.

Above processes can be illustrated with figures. Flowcharts will be used to illustrate the working process of the UE and the RNC.

FIG. 1 shows that the UE in URA_PCH mode receives the notification message from the RNC, which includes the indication for counting UE to initiate the Cell Update process.

In 101 of FIG. 1, Controlling RNC (CRNC) needs to send a notification message to the UEs to count the number of UEs that is receiving the MBMS, this notification message is sent on MCCH or on other channels, and includes an indication for counting or recounting.

In 102 of above FIG. 1, after the UE in URA_PCH mode receives the message sent in 101, it needs to organize the Cell Update message. If the MBMS notification message includes the indication for UE counting, the reason for cell update is set as "UE counting".

In 103 of above FIG. 1, if an Iur interface exists, the DRNC (Destination RNC) needs to resolve the SRNC (Source RNC) ID and the UE SRNTI involved and assign DRNTI as well as CRNTI to the UE when receiving the message of "Cell Update". And then it sends the message of "Uplink Signaling Transfer" to the SRNC, which includes the Cell Update message, as well as the new cell ID, destination RNC ID, DRNTI and CRNTI.

In 104 of above FIG. 1, the SRNC analyzes the reason for cell update and then perform different steps accordingly. If the reason for cell update is "For MBMS UE conuting", the SRNC sends a message of "MBMS Attach Request" to the DRNC, which makes the DRNC count UEs in URA_PCH mode.

In Step 105 of above FIG. 1, the SRNC sends the message of "MBMS Attach Request", which includes cell ID, MBMS ID and UE ID.

Step 106 of above FIG. 1 gives a response message to Step 105. The DRNC counts UEs in URA_PCH mode and sends a message of "MBMS Attach Response", which includes MBMS ID, channel type, or perhaps channel parameters as well.

In Step 107 of above FIG. 1, the SRNC sends a message of Cell Update Confirmation to the UE. If the RNC hasn't completed the counting or recounting process yet, this message doesn't include MBMS channel information, which makes the UE stay in CELL_FACH state and wait for channel configuration message sent by the RNC. If the counting or recounting process has been completed, and the MBMS channel type and parameters don't change, the Cell Update Confirmation message is permitted not to include MBMS channel parameters, which makes the UE go back to URA_PCH state for receiving. If the MBMS channel type and parameter change, the Cell Update Confirmation message will include MBMS channel parameters, and the UE configures MBMS channel according to this message. If a response message is needed, the UE goes to Step 110 to send a message of "MBMS Channel Reconfiguration Complete" to the SRNC, and then transfers to CELL_DCH state to receive the MBMS data.

Figure 2:
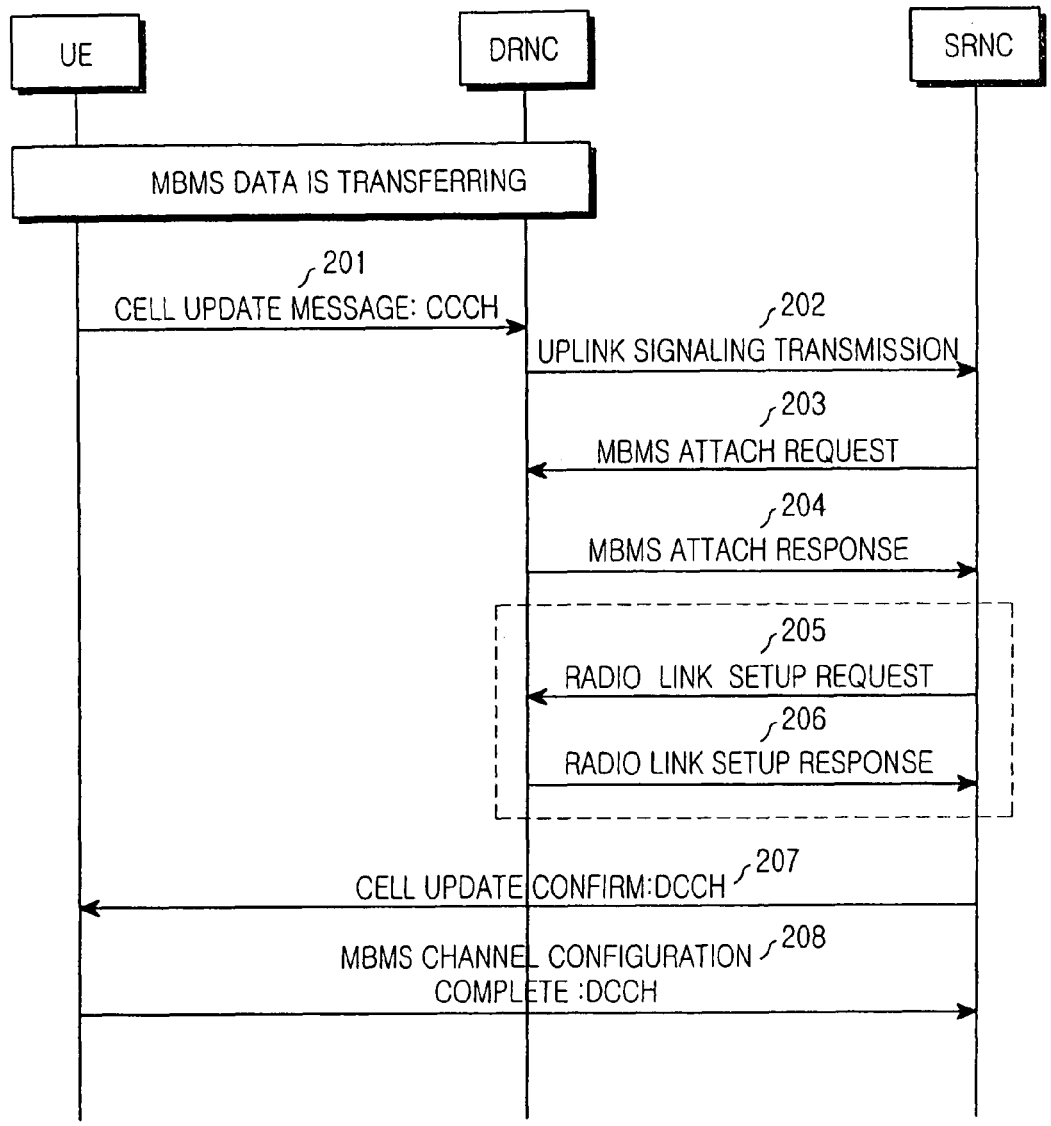
FIG. 2 shows that UE in URA_PCH mode moves to a new cell.

FIG. 2 shows that the UE in URA_PCH mode moves to the new cell. If the UE knows that the MBMS channel type used by the new cell is PtP, it needs to send the Cell Update message to Destination RNC to establish the PtP channel with the RNC. If the UE doesn't know the MBMS channel parameters of the new cell, it also needs to send the Cell Update message to Destination RNC after handoff to obtain the MBMS channel configuration parameters of the new cell.

In 201 of above FIG. 2, after the UE in URA_PCH mode moves to the new cell, if it knows that the MBMS channel type used by the destination cell is PtP according to the indication of PtP channel included in the broadcast message from the source cell or in the notification message from the destination cell, it needs to send the Cell Update message to the destination cell. The reason for cell update is set as "For MBMS PtP mode". If the UE in URA_PCH mode doesn't know the MBMS channel and channel configuration parameters of the new cell when it moves to the new cell, it needs to send the Cell Update message to the new cell to get the MBMS channel configuration parameters of the new cell. The reason for cell update is set as "For MBMS channel parameters".

In 202 of above FIG. 2, if the new cell and the source cell are not under the same RNC, i.e. Iur interface exists, the DRNC needs to resolve the SRNC ID and the UE SRNTI involved and assign DRNTI as well as CRNTI to the UE when receiving the message of "Cell Update". And then it sends the message of "Uplink Signaling Transfer" to the SRNC, which includes the Cell Update message, as well as the new cell ID, DRNC ID, DRNTI and CRNTI.

In 203 of above FIG. 2, the SRNC sends the message of "MBMS Attach Request".

In 204 of above FIG. 2, the DRNC sends the message of "MBMS Attach Response". This message should include MBMS channel type and channel parameters of the new cell.

In 205 of above FIG. 2, if the new cell uses the PtP MBMS channel, the SRNC needs to establish the PtP MBMS channel with the DRNC and the UE. Step 205 and Step 206 are the same as those steps establishing radio link in WCDMA standard, so no detailed explanation will be given here. In Step 205, the SRNC assigns radio resources on the Iur interface and sends a message of "Radio Link Establishment Request" to the DRNC, which requires to establish a dedicated radio link.

Step 206 of above FIG. 2 gives a response message to Step 205. The DRNC sends the message of "Radio Link Establishment Request" to the NodeB that is controlled by it. The NodeB allocates dedicated radio resources and sends a response message of "Radio Link Establishment Complete" to the DRNC. After receiving this message, the DRNC sends a message of "Radio Link Establishment Response" to the SRNC.

In 207 of above FIG. 2, the SRNC sends the message of "Cell Update Confirmation". This message includes MBMS channel type and channel parameters, and if the channel type is PtP, the state of UE transfers to CELL_DCH.

In 208 of above FIG. 2, if the MBMS channel type is PtP, the UE needs to send a message of "MBMS Channel Configuration Complete", and enter CELL_DCH state. If the MBMS channel type is Point-to-multipoint, this step is not needed. The UE only needs to configure MBMS point-to-multipoint channel and continue receiving MBMS data.

Figure 10:
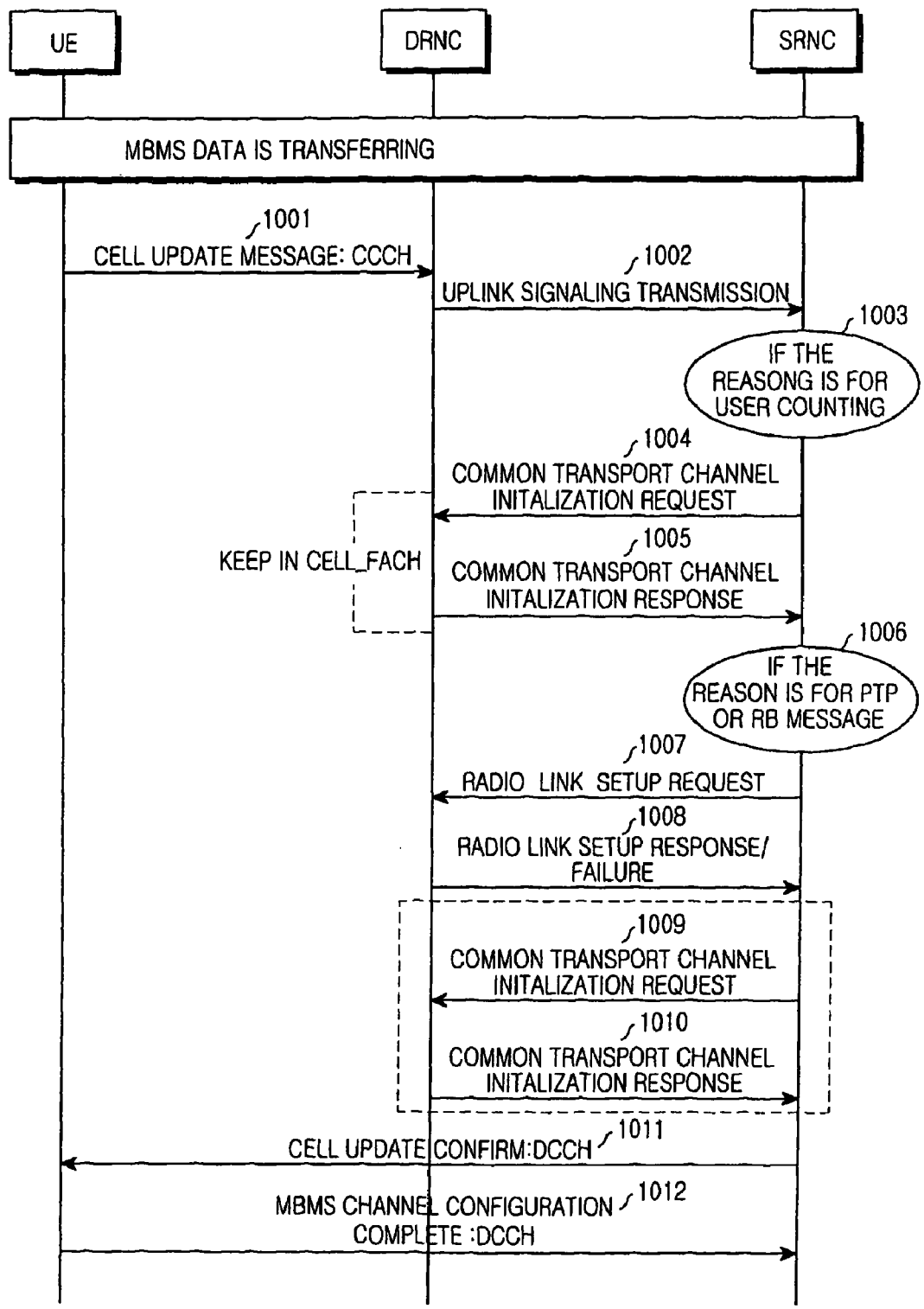
FIG. 10 shows the flow for the UE in CELL_FACH or CELL_PCH mode to initiate the uplink signaling.

FIG. 10 shows the process of cell update initiated by the MBMS UE in CELL_FACH or CELL_PCH. When the UE moves to the new cell, if it knows from the MBMS control channel (MCCH) of the destination cell that the new cell is using the MBMS channel type of point-to-point, it needs to sends the Cell Update message to the destination RNC to establish the point-to-point channel with the RNC. If the UE doesn't know the MBMS channel parameters of the new cell, it also needs to send the Cell Update message to the Destination RNC after handoff to obtain the MBMS channel configuration parameters of the new cell. If the channel type of the destination cell is PTM, the UE executes Cell Update in existing technology and this invention won't describe for this case. Otherwise, although the UE in CELL_PCH mode doesn't move, when receiving the indication for UE counting on MCCH of this cell, it also needs to initiate the Cell Update process.

In 1001 of above FIG. 10, when the UE in CELL_FACH or CELL_PCU mode moves to the new cell, if the broadcast message of the source cell or MBMS control channel of the destination cell includes the indication for point-to-point channel, the UE knows that the MBMS channel type used by the destination cell is point-to-point. Then the UE needs to send the Cell Update message to the destination cell. The reason for cell update is set as "For MBMS PtP mode". When the UE in CELL_FACH or CELL_PCH mode moves to the new cell, if it doesn't receive MCCH or there is no information of the business on the MCCH, and it doesn't know the MBMS channel type and channel configuration parameters of the new cell, it needs to send the Cell Update message to the new cell to get the MBMS channel configuration parameters of the new cell. The reason for cell update is set as "For MBMS channel parameters". If the UE in CELL_PCH mode receives the indication for UE counting from the MCCH, it sends the Cell Update message to the RNC, and the reason for cell update is set as "For MBMS UE counting".

In 1002 of above FIG. 10, if the destination cell and the source cell are not under the same RNC, i.e. the Iur interface exists, the destination RNC needs to resolve the SRNC ID and the UE SRNTI involved and assign the DRNTI as well as the CRNTI to the UE when receiving the message "Cell Update". And then it sends the message of "Uplink Signaling Transfer" to the SRNC, which includes the Cell Update message, as well as the new cell ID, DRNC ID, DRNTI and CRNTI.

In 1003 of above FIG. 10, the SRNC analyzes the reason for cell update. If the reason is "For MBMS UE counting", the SRNC makes the UE enter CELL_FACH state and perform Step 1004 and 1005.

In 1004 of above FIG. 10, the SRNC establishes context for the UE on the DRNC, and sends a "Common Transport Channel Initialization Request" message to the DRNC, which includes UE ID, cell ID and MBMS ID. The DRNC saves the context for the UE.

In 1005 of above FIG. 10, the DRNC sends a "Common Transport Channel Initialization Response" message to the SRNC. If there is no transfer bearer on the Iur interface for this UE, the SRNC also needs to establish a transfer bearer on the Iur interface for this UE.

In 1006 of above FIG. 10, the SRNC analyzes the reason for cell update. If the reason is "for PtP mode", or "for MBMS channel parameters", the SRNC enters Step 1007 and sends a "Radio Link Establishment Request" message. This message includes cell ID, UE ID and List of MBMS business IDs that the UE has applied for. After receiving this message, the DRNC needs to add the number of MBMS UEs of this cell by one and judge the MBMS channel type used by the cell.

In 1008 of above FIG. 10, if the channel type is still PtP, the DRNC sends a "Radio Link Establishment Response" message and jumps to Step 1011.if the channel type is changed from PtP to PtM, the DRNC sends a "Radio Link Establishment Failure" message and notifies the SRNC of the failure reason for PtM MBMS channel in the failure message. Otherwise, it tells the SRNC the new channel type. If necessary, the channel parameters of PtM can also be included.

In 1009 of above FIG. 10, if the destination cell uses PtM channel and the SRNC decides to keep the UE in CELL_FACH state, the SRNC establishes a context on the DRNC for the UE and sends the "Common Transport Channel Initialization Request" message to the DRNC, which includes UE ID, cell ID and MBMS business ID. The DRNC saves the context for this UE.

Step 1010 of above FIG. 10 is the response message to Step 1009. The DRNC sends the "Common Transport Channel Initialization Response" message to the SRNC. If there is no transfer bearer on the Iur interface for this UE, the SRNC also needs to establish the transfer bearer on the Iur interface for this UE.

In 1011 of above FIG. 10, the SRNC sends the message of "Cell Update Confirmation". This message includes MBMS channel type and channel parameters. If channel type is PtP, the state of UE transfers to CELL_DCH. If the channel type is PtM, the UE keeps in CELL_FACH or CELL_PCH state.

In 1012 of above FIG. 10, if the MBMS channel type is PtP, the UE needs to send the message of "MBMS Channel Configuration Complete", and enter CELL_DCH state. If MBMS cannel type is Point-to-multipoint, this step is not needed. The UE only needs to configure the MBMS point-to-multipoint channel and continue receiving the MBMS data.

Figure 3:
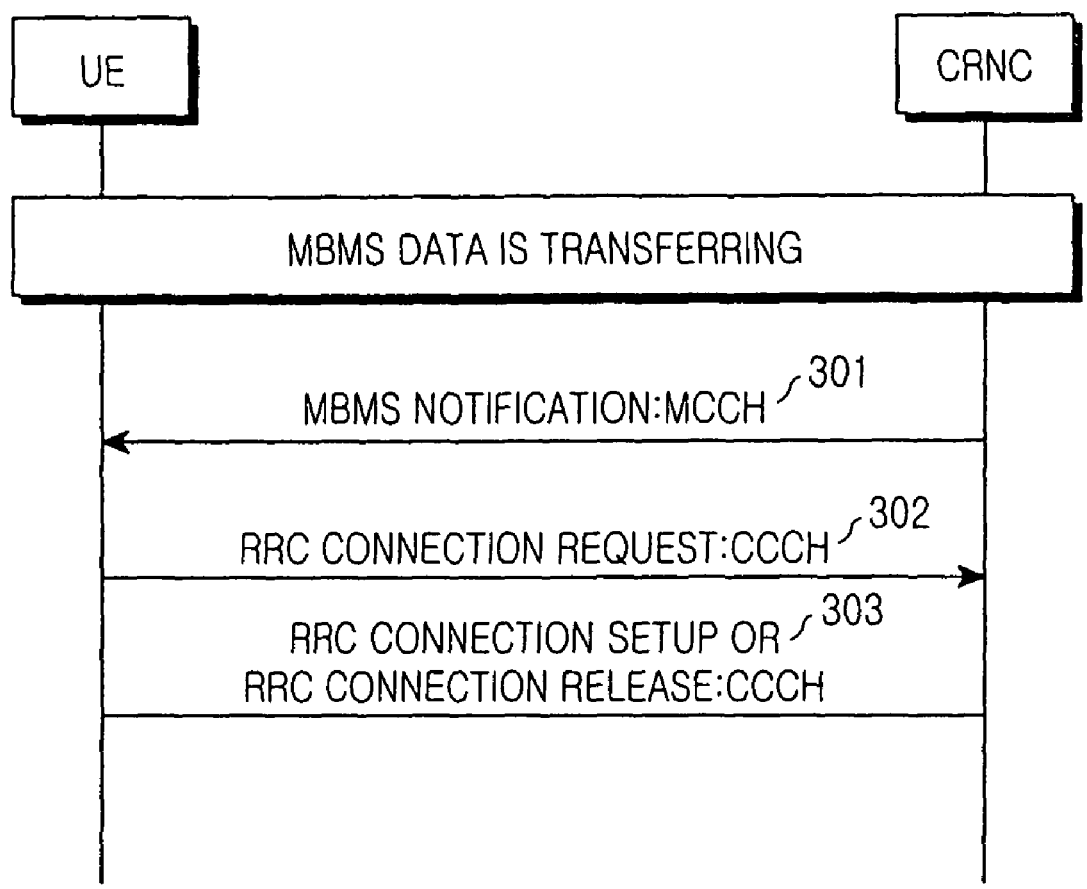
FIG. 3 shows the process of the UE in IDLE mode sending a RRC Connection Request message.

FIG. 3 shows the process of the UE in IDLE mode receiving a notification message from the RRC. This message includes the indication for counting UEs. Either the MBMS channel mode is indicated to be PtP, or when the UE in IDLE mode moves to the new cell, the UE needs to initiate a process of RRC Connection Request message in order to obtain the MBMS channel configuration parameters of the new cell.

In 301 of above FIG. 3, Controlling RNC needs to send the notification message to UEs to count the number of UEs that is receiving MBMS. This notification message is sent on the MCCH or on other channels, and includes the indication for counting or recounting. The CRNC needs to establish the PtP MBMS channel. The RNC needs to send the notification message to the UE in IDLE mode to make UE establish the PtP MBMS channel.

In 302 of above FIG. 3, when the UE in IDLE mode receives the message in 301, it organizes the message of RRC Connection Request, which includes MBMS ID to make the RNC identify that the UE has joined the MBMS. Tile reason for RRC connection establishment is set as "For MBMS UE counting" and is sent to the RNC. Otherwise, when the UE in IDLE mode moves to the new cell, it needs to organize the message of RRC Connection Request to obtain the channel parameters of the new cell. The reason for RRC connection establishment is set as "For MBMS channel parameters". If the indication for PtP channel is included in the broadcast message from the source cell before handoff or in the notification message from the destination cell after handoff, the UE in IDLE mode gets to know that the cell is using MBMS channel type of PtP. Then it sends a message of RRC Connection Request to destination cell and sets the reason for RRC connection establishment as "For MBMS PtP mode".

In 303 of above FIG. 3, if the reason for RRC connection establishment is "For MBMS UE counting" and the message is received during the UE counting or recounting process, the RNC counts the UEs in IDLE mode and sends a message of "RRC Connection Establishment Request" to the UE and indicating the UE to enter CELL_FACH state, which doesn't include MBMS channel type and parameters,and the UE keeps in connection state. If the counting or recounting process has been completed, the cell uses point-to-multipoint channel. The RNC sends a message of "RRC Connection Release" to make the UE go back to IDLE mode to receive data. During the recounting process, this message may not include MBMS channel parameters. If the channel type changes, the RNC sends the message of "RRC Connection Establishment Request" to the UE, which includes MBMS channel ID, channel type and channel parameters. After receiving this message, the UE configures the new MBMS channel type and parameters and transfers to CELL_DCH state to receive data and sends the response message at the same time. If the reason for RRC connection establishment is set as "For MBMS channel parameter" and the MBMS channel type of the new cell is PtP, the RNC sends the message of "RRC Connection Establishment Request", which includes MBMS channel ID, channel type and channel parameters. After the UE receives this message, it configures the PtP channel and then sends the message of "RRC Connection Establishment Response" to the RNC. If the MBMS channel type of the new cell is point-to-multipoint, the RNC sends the message of "RRC Connection Release", which includes MBMS channel ID, channel type and channel parameters. If the reason for RRC connection establishment is set as "For MBMS PtP mode", the RNC sends the message of "RRC Connection Establishment Request", which includes MBMS channel ID, channel type and channel parameters. After the UE receives this message, it configures the PtP channel and then sends the message of "RRC Connection Establishment Response" to the RNC.

Figure 4:
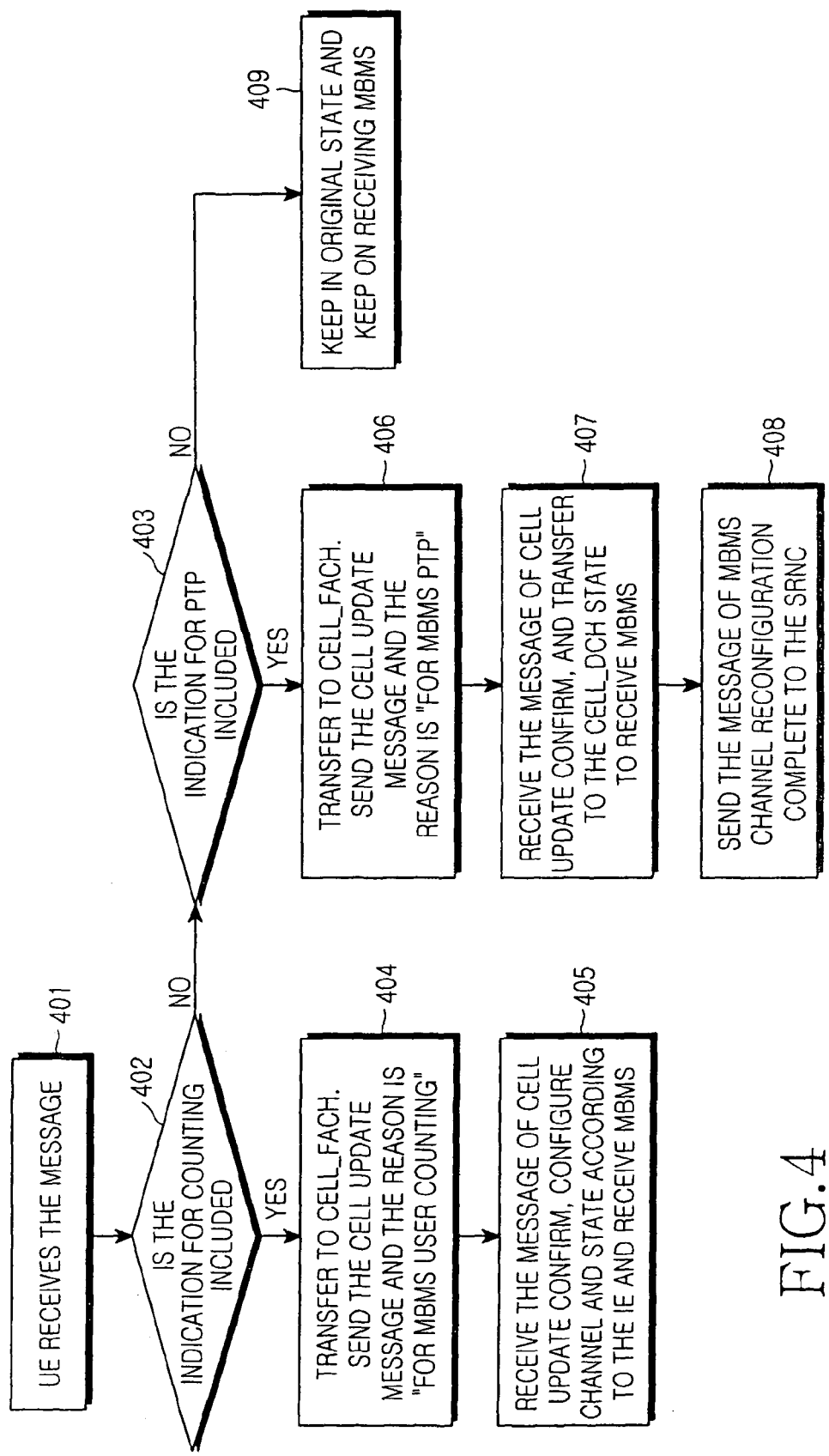
FIG. 4 illustrates the actions of the UE in URA_PCH mode when receiving the notification message from the RNC.

FIG. 4 illustrates the actions of the UE when receiving the notification message from the RNC.

In 401 of above FIG. 4, the UE receives the message sent from the RNC. Above message is the notification message in Step 101.

In 402 of above FIG. 4, the UE in URA_PCH mode determines if the message received includes "Indication for UE counting". If so, it enters Step 404; otherwise, it enters Step 403 to determine if the notification message includes "Indication for MBMS PtP mode". If so, the UE enters Step 406; otherwise, it enters Step 409.

In 404 of above FIG. 4, the UE transfers to CELL_FACH state and organizes the message of Cell Update, in which the reason for cell update is set as "For MBMS UE counting". And then it sends this message to the SRNC. In Step 405, the UE receives the response message from Step 404, i.e. the Cell Update Confirmation. The UE configures the UE channel and state according to this message, and then continues to receive MBMS UE data.

In Step 406 of above FIG. 4, the UE transfers to CELL_FACH state and organizes the message of Cell Update, in which the reason for cell update is set as "For MBMS PTP mode". And then it sends this message to the SRNC. In Step 407, the UE receives the response message from Step 406, i.e. Cell Update Confirmation. This message makes the UE re-configure the MBMS channel and transfer to the CELL_DCH state to receive data. Then the UE executes Step 408 in above FIG. 4 to send the message of MBMS Channel Reconfiguration Complete to the SRNC.

In Step 409 of above FIG. 4, the UE needn't to send the Cell Update message and keeps in URA_PCH state to receive the MBMS data.

Figure 5:
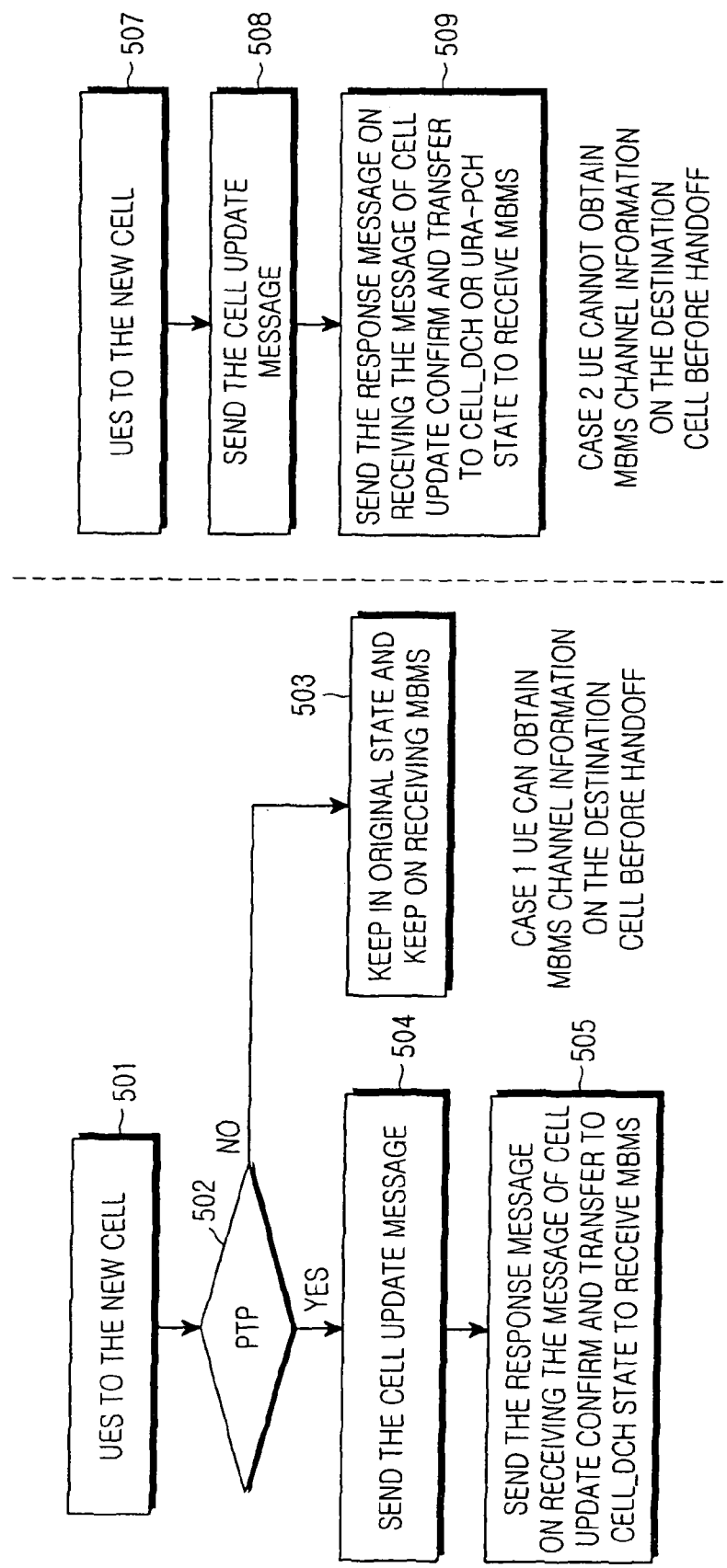
FIG. 5 illustrates the actions of the UE in URA_PCH mode when moving to a new cell.

FIG. 5 illustrates the actions of the UE in URA_PCH mode when moving to the new cell.

In 501 of above FIG. 5, the UE in URA_PCH mode moves to the new cell. Case 1 is that UE has obtained action explanation of the MBMS cannel configuration parameters of the new cell before it moves. In Step 501, the UE moves to the new cell. In 502 of above FIG. 5, the UE determines if the new cell uses the MBMS channel of PtP. If so, it enters Step 504; otherwise, it enters Step 503. The UE in URA_PCH mode keeps on receiving MBMS data under URA_PCH state.

In 504 of above FIG. 5, if the MBMS channel type of the new cell is PtP, the UE in URA_PCH mode sends the message of "Cell Update". The reason for connection establishment is "For MBMS PtP mode".

In 505 of above FIG. 5, the UE waits for the response message of "Cell Update Confirmation" from the RNC, which includes UE state, MBMS Service ID, channel type and channel parameters. The UE sends the response message of "MBMS Channel Reconfiguration Complete" to the RNC according to the channel configuration parameters in the message, and transfers to CELL_DCH state to receive the MBMS.

Case 2 is that the UE in URA_PCH mode didn't obtain the MBMS channel configuration parameters of the destination cell before it moves.

In 507 of above FIG. 5, this UE moves to the new cell.

In 508 of above FIG. 5, the UE in URA_PCH mode organizes and sends the message of "Cell Update". The reason for connection establishment is "For MBMS channel parameters".

In Step 509 of above FIG. 5, the RNC organizes and sends the message of "Cell Update Confirmation" after receiving the message of "Cell Update" from the UE. This message include UE state, MBMS service ID, channel type and channel parameters. After receiving this message, the UE configures channel according to the message and sends the message of "MBMS Channel Reconfiguration Complete". If the channel type is PtP and the UE state is CELL_DCH, the UE enters CELL_DCH state to receive the MBMS. If the cell is point-to-multipoint channel, then the UE enters URA_PCH to receive the MBMS.

Figure 6:
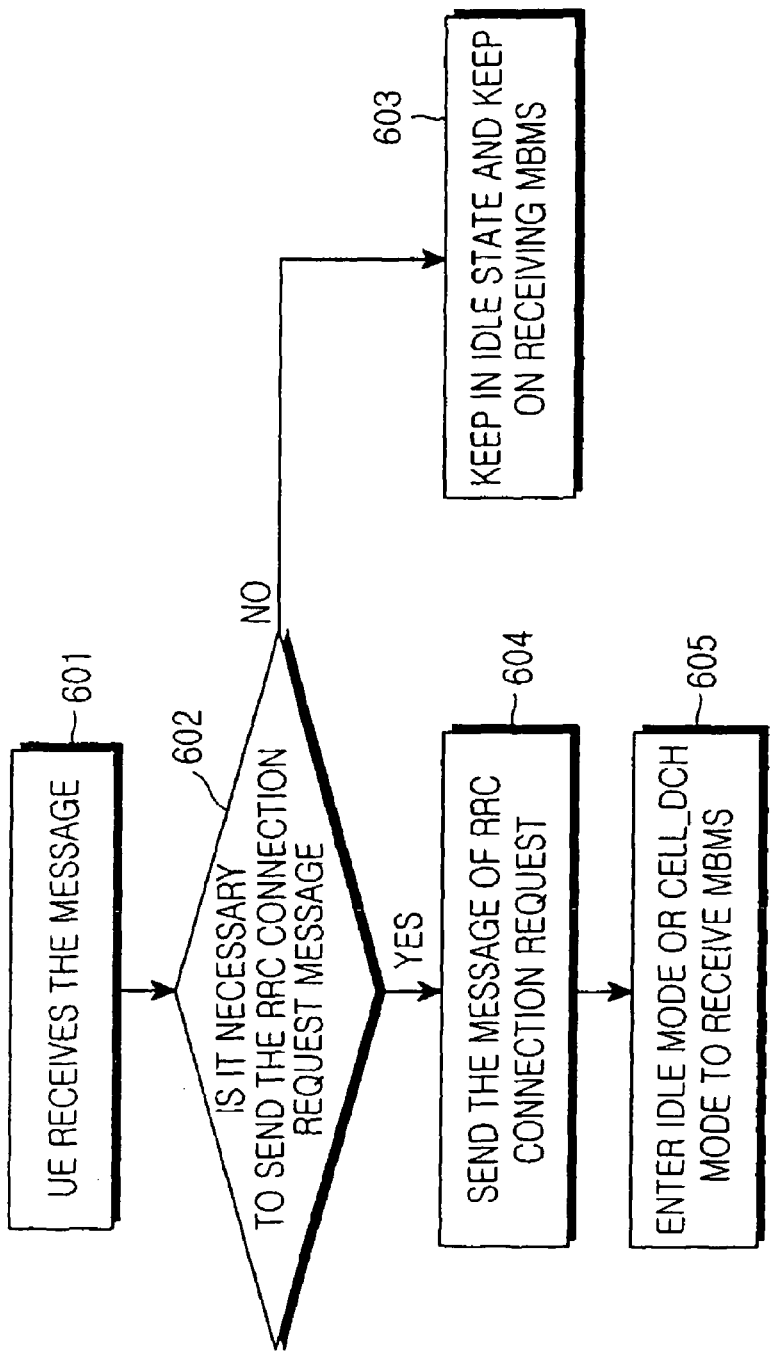
FIG. 6 illustrates the actions of the UE in IDEL mode when receiving the notification message from the RNC.

FIG. 6 illustrates the actions of the UE in IDEL mode when receiving the notification message from the RNC.

In 601 of above FIG. 6, the UE in IDLE mode receives the message sent from the RNC. Above message is the notification message in Step 101.

In 602 of above FIG. 6, the UE in IDLE mode determines if the message received indicates that the message of "RRC Connection Request" is needed to be sent. If so, it enters Step 604; otherwise, it enters Step 603. The UE keeps ill IDLE mode to receive the MBMS data.

In 604 of above FIG. 6, the UE in IDLE mode organizes and sends the message of "RRC Connection Request", and sets the reason for connection establishment as "For MBMS UE counting", and then it waits for reply.

In 605 of above FIG. 6, the UE receives the response message from the RNC. This message may be the "RRC Connection Release" or "RRC Connection Establishment Request". If it is the latter,the UE enters CELL_FACH state according to the message content and configures the corresponding channel, and sends the response message. The UE configures the MBMS parameters according to the message and receives the MBMS data in according state.

Figure 7:
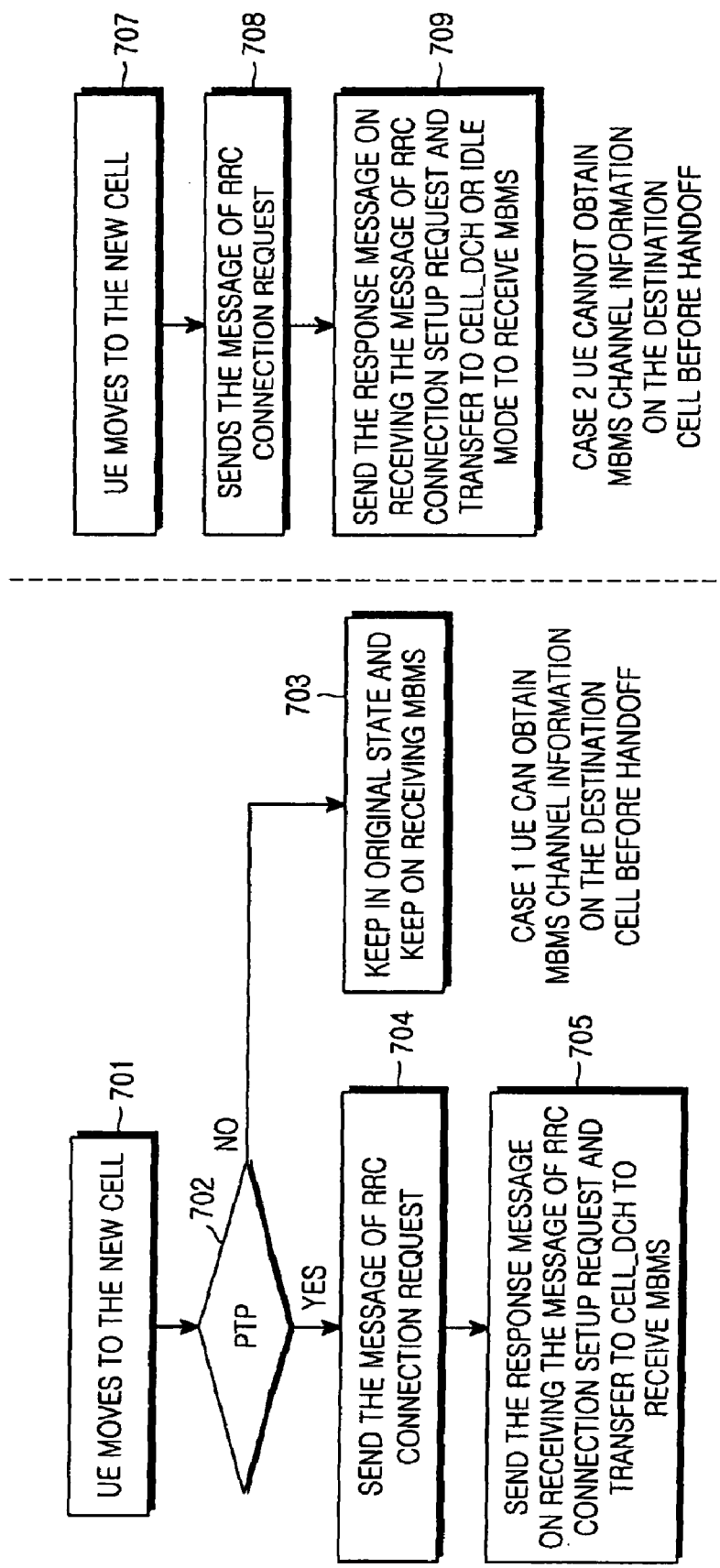
FIG. 7 illustrates the actions of the UE in IDLE mode when moving to a new cell.

FIG. 7 illustrates the actions of the UE in IDLE mode when moving to the new cell.

In 701 of above FIG. 7, the UE in IDLE mode moves to the new cell. Case 1 is that UE has obtained action explanation of the MBMS cannel configuration parameters of the new cell before it moves. In Step 701, the UE moves to the new cell. In 702 of above FIG. 7, the UE determines if the new cell uses the MBMS channel of PtP. If so, it enters Step 704; otherwise, it enters Step 703, and the UE in IDLE mode keeps on receiving the MBMS data under IDLE state.

In 704 of above FIG. 7, if the MBMS channel type of the new cell is PtP, the UE in IDLE mode sends the message "RRC Connection Request". The reason for connection establishment is "For MBMS PtP mode".

In 705 of above FIG. 7, UE waits for the response message "RRC Connection Establishment Request" from the RNC and transfers to CELL_DCH state to receive the MBMS.

Case 2 is that the UE in IDLE mode didn't obtain the MBMS channel configuration parameters of the destination cell before it moves.

In 707 of above FIG. 7, this UE moves to the new cell.

In 708 of above FIG. 7, the UE in IDLE mode organizes and sends the message of "RRC Connection Request". The reason for connection establishment is "For MBMS channel parameters".

In Step 709 of above FIG. 7, the RNC receives the message of "RRC Connection Request" from the UE. According to the MBMS channel type of the cell, if the type is PtP, the RNC organizes and sends the message of "RRC Connection Establishment Request". After UE receives this message, it needs to configure the PtP channel according to the message and then sends the message of "RRC Connection Complete Response". And then it enters CELL_DCH state to receive the MBMS. If this cell is the Point-to-multipoint channel, the RNC sends the message of "RRC Connection Release". After receiving this message, the UE configures the point-to-multipoint channel according to the message and releases the RRC connection, and then enters IDLE mode to receive the MBMS.

Figure 8:
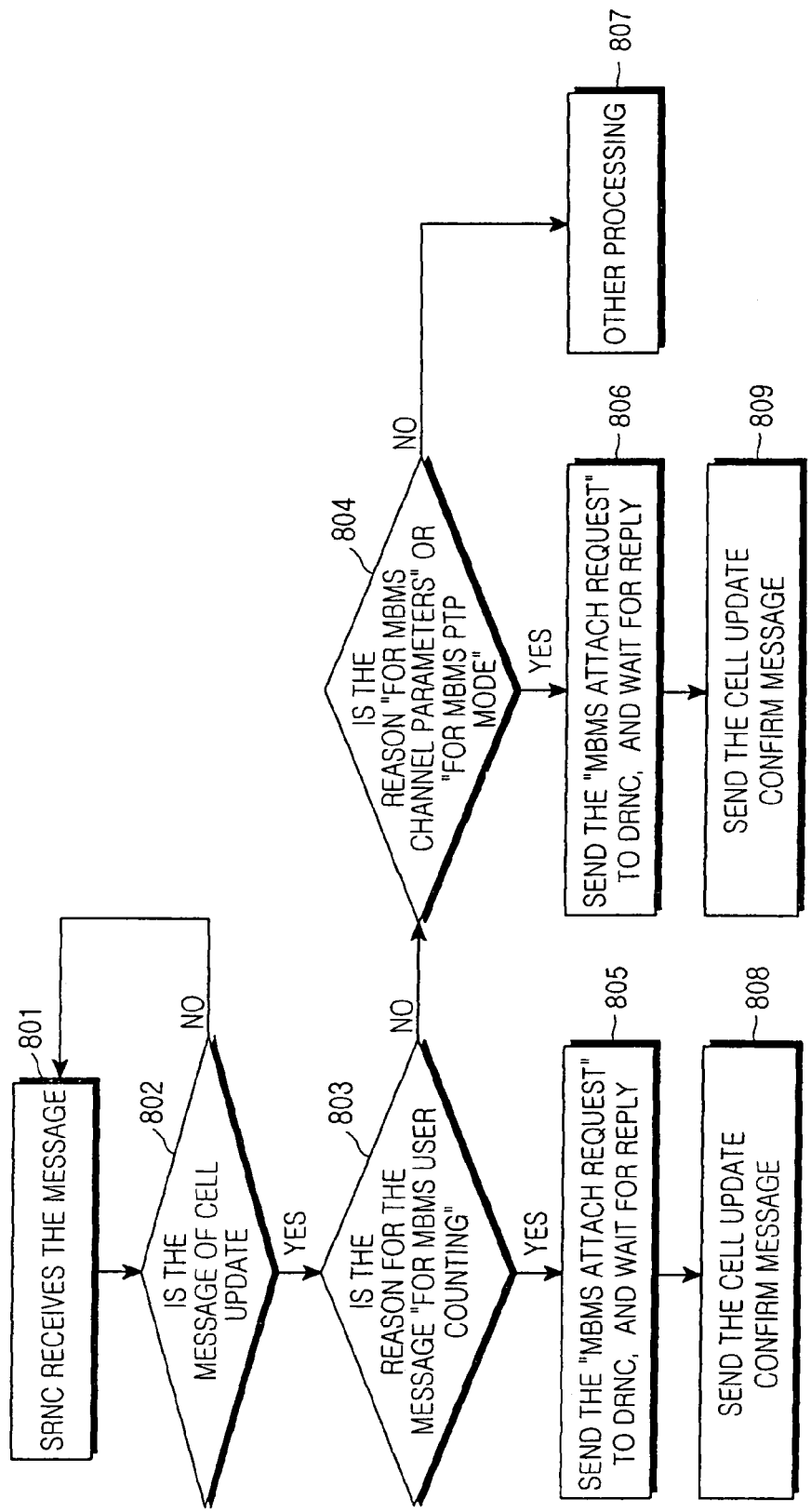
FIG. 8 illustrates the actions of the SRNC when receiving the Cell Update message.

FIG. 8 illustrates the actions of the SRNC when receiving the Cell Update message.

In 801 of above FIG. 8, the SRNC receives the message.

In 802 of above FIG. 8, the SRNC determines if the message is the Cell Update message. If so, it enters Step 803; otherwise, it executes the processing step of the other messages.

In 803 of above FIG. 8, the SRNC determines if the reason for cell update is "For MBMS UE statistics". If so, it enters Step 805; otherwise, it enters Step 804. In Step 804, the SRNC determines if the reason for cell update is "For MBMS PTP mode" or "For MBMS channel parameters". If so, it enters Step 806; otherwise, it enters Step 807 to execute the processing of the other messages.

In 805 of above FIG. 8, the SRNC sends the message of "MBMS Attach Request" to the DRNC and waits for reply.

In 808 of above FIG. 8, after receiving the response message from the DRNC, the SRNC sends the message of Cell Update Confirmation to the UE. If the counting or recounting process hasn't been completed, this message won't include channel parameters. After the RNC has counted the MBMS channel types used by the cell, this message can also include channel type and parameters.

In 806 of above FIG. 8, the SRNC sends the message of "Radio Link Establishment Request" to the DRNC and waits for reply.

In 809 of above FIG. 8, after receiving the response message from the DRNC, the SRNC sends the message of Cell Update Confirmation to UE, and wait for the response message from UE. This message includes MBMS channel type and parameters of the cell.

Figure 9:
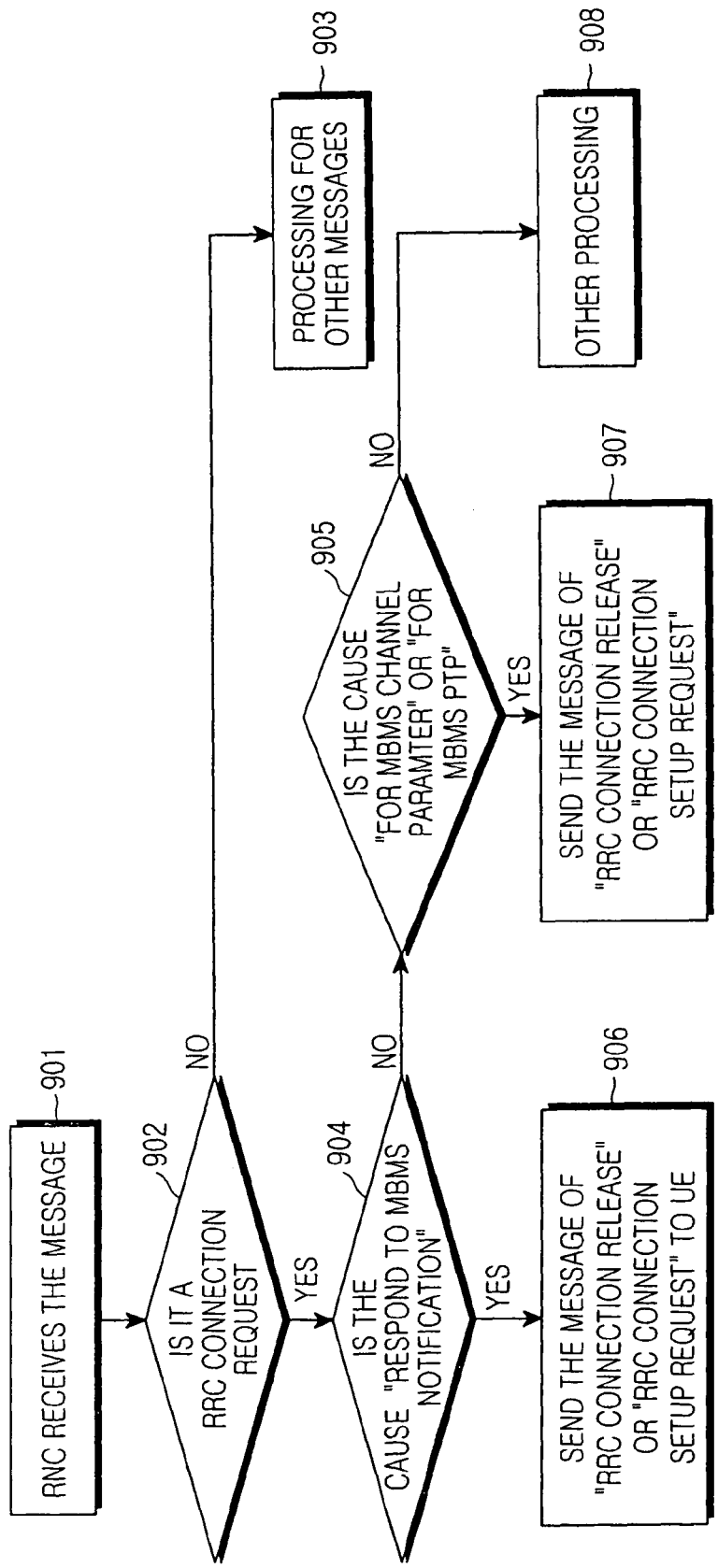
FIG. 9 illustrates the actions of the RNC when receiving a RRC Establishment Request message.

FIG. 9 illustrates the actions of the RNC when receiving the message.

In 901 of above FIG. 9, the RNC receives the message.

In 902 of above FIG. 9, the RNC determines if the message is the RRC Establishment Request. If so, it enters Step 904; otherwise, it executes the processing step of the other messages.

In 904 of above FIG. 9, the RNC determines if the reason for RRC connection establishment is "For MBMS UE counting". If so, it enters Step 906; otherwise, it enters Step 905. In Step 905, the RNC determines if the reason for cell update is "For MBMS PTP mode" or "For MBMS channel parameters". If so, it enters Step 907; otherwise, it enters Step 908 to execute the processing of the other messages.

In 906 of above FIG. 9, if the counting process has been completed and the channel used by the cell is point-to-multipoint, the RNC sends the RRC Connection Release message to the UE, which can include channel type and parameters. If the counting process hasn't been completed, the RNC sends the message of RRC Connection Establishment Request to the UE, which won't include channel type and channel parameters. In the RRC Connection Establishment Request message, the RNC indicates the UE to enter CELL_FACH state.

In 907 of above FIG. 9, if the destination cell uses point-to-multipoint channel, the RNC sends the message of RRC Connection Release, which includes MBMS channel type and parameters of the destination cell. If the destination cell uses the PtP channel, the RRC sends the message of Connection Establishment Request to the UE, which includes MBMS channel types and parameters in the cell.

What is claimed is:

1. A method for initiating uplink signaling by a UE receiving a multimedia multicast/broadcast service (MBMS), the method comprising steps of:
   (a) receiving over a MBMS control channel information including an indication indicating one of UE counting and point-to-point channel being used as MBMS channel type in a cell providing mobile communication service to the UE;
   (b) in case a UE is in IDLE mode upon receiving the information including the received indication, transmitting, by the UE, an uplink signaling message including a request for an RRC (Radio Resource Control) Connection establishment and constructed using the received indication; and
   (c) receiving, by the UE, a response message in response to the uplink signaling message;
   wherein when the received indication indicates UE counting, the uplink signaling message includes reason informaton indicating that one reason for including the request in the uplink signaling message is due to consideration of UE counting;
   wherein when the received indication indicates point-to-point channel being used as MBMS channel type in the cell, the uplink signaling message includes reason informaton indicating that one reason for including the request in the uplink signaling message is due to consideraton of point-to-point channel being used as MBMS channel type in the cell, and the response message received by the UE includes configuration information allowing the UE to configure a point-to-point channel for receiving MBMS services in the cell.

2. The method according to claim 1, wherein step (b) further comprises:
   in case the UE is in CELL_FACH, CELL_PCH, or URA_PCH mode upon receiving the information including the received indication, transmitting, by the UE, an uplink signaling message including a request for a Cell Update and constructed using the received indication.

3. The method according to claim 2, wherein said uplink signaling message for a Cell Update comprises a Cell Update message.

4. The method according to claim 1, said uplink signaling message for an RRC Connection establishment comprises an RRC Connection Request message.

5. The method according to claim 3, wherein a value for a field named "Reason for cell update" included in the Cell Update message is set as "For MBMS channel parameters".

6. The method according to claim 3, wherein a value for a field named "Reason for cell update" in the Cell Update message is set as "For MBMS PtP mode".

7. The method according to claim 3, wherein a value for a field named "Reason for cell update" in the Cell Update message is set as "For MBMS UE counting".

8. The method according to claim 4, wherein a value for a field named "Reason for connection establishment" in the RRC Connection Request message is set as "MBMS channel parameter".

9. The method according to claim 4, wherein a value for a field named "Reason for connection establishment " in the RRC Connection Request message is set as "MBMS PtP mode".

10. The method according to claim 4, wherein a value for a field named "Reason for connection Establishment" in the RRC Connection Request message is set as "For MBMS UE counting".

11. The method according to claim 2, further comprising:
sending a Radio Link Establishment Request message by a SRNC to a DRNC if an Iur interface exists and a reason for cell update included in said uplink signaling message is set as "For MBMS PtP mode".

12. The method according to claim 11, further comprising:
adding the UE into a context of the MBMS by the DRNC by adding a number of participating UEs by 1 after receiving the Radio Link Establishment Request message, and if the increase of the number of participating UEs makes a channel type of the MBMS change from PtP to PtM, the DRNC sending a Radio Link Establishment Failure message to the SRNC.

13. The method according to claim 2, further comprising:
keeping the UE in CELL_FACH state and sending a Common Transport Channel Resource Initialization message to the DRNC by the SRNC if the Iur interface exists and the SRNC knows that a destination cell under the DRNC uses PtM as the channel type of the MBMS.

14. A multimedia multicast/broadcast service (MBMS) user equipment (UE) for initiating uplink signaling, the UE comprising:
a receiver for receiving over an MBMS control channel information including an indication indicating one of UE counting and point-to-point channel being used as MBMS channel type in a cell providing mobile communication service to the UE, and for receiving a response message in response to an uplink signaling message; and
a transmitter for, in case the UE is in IDLE mode upon receiving the information including the received indication, transmitting the uplink signaling message including a request for an RRC (Radio Resource Control) Connection establishment and constructed using the received indication;
wherein when the received indication indicates UE counting, the transmitter transmits the uplink signaling message including reason informaton indicating that one reason for including the request in the uplink signaling message is due to consideration of UE counting;
wherein when the received indication indicates point-to-point channel being used as MBMS channel type in the cell, the transmitter transmits the uplink signaling message including reason informaton indicating that one reason for including the request in the uplink signaling message is due to consideraton of point-to-point channel being used as MBMS channel type in the cell, and the response message received by the UE includes configuration information allowing the UE to configure a point-to-point channel for receiving MBMS services in the cell.

15. The UE according to claim 14, wherein the transmitter, in case the UE is in CELL_FACH, CELL_PCH, or URA_PCH mode upon receiving the information including the received indication, transmits the uplink signaling message including a request for a Cell Update using the received indication.

16. The UE according to claim 15, wherein the uplink signaling message for a Cell Update includes a cause corresponding to the received indication.

* * * * *